Patented July 22, 1924.

1,501,914

UNITED STATES PATENT OFFICE.

YASUJURO NIKAIDO, OF BAY CITY, MICHIGAN, ASSIGNOR TO MICHIGAN CHEMICAL COMPANY, A CORPORATION OF MICHIGAN.

FERTILIZER AND PROCESS OF MAKING THE SAME.

No Drawing.     Application filed June 7, 1922. Serial No. 566,586.

*To all whom it may concern:*

Be it known that I, YASUJURO NIKAIDO, a citizen of Japan, and a resident of Bay City, in the county of Bay and State of Michigan, U. S. A., have made a new and useful invention in Fertilizers and Processes of Making the Same, of which the following is a specification.

The invention relates to fertilizers and has for its primary objects the provision of an improved form of fertilizer in powder form which does not collect moisture from the atmosphere and become sticky and difficult to handle under such conditions and which may be made very cheaply from products which have been regarded heretofore more or less as waste products resulting from the manufacture of beet sugar.

In the manufacture of beet sugar, there is a large quantity of evaporated Steffens waste water, and in the beet molasses distillery, a large quantity of evaporated spent liquor or slop, such products being known as "beet sugar residue." This residue contains fertilizer elements of value, such as potash and ammonia and has heretofore been sold to a certain extent to fertilizer manufacturers to mix with other materials, such as phosphate rock (calcium phosphate) to make a complete fertilizer, but the residue has never been utilized by itself or in a primary way as a fertilizer as it is of a viscous character, and those using the fertilizers ordinarily have no facilities for applying thick, liquid fertilizers. One of the objects of this invention is to transform the residue into a solid form in which it may be readily utilized and to accomplish this object at a small cost.

Another waste product which results from the manufacture of beet sugar is the calcium carbonate known as waste lime or lime cake which is produced in large quantities and is of practically no value, so that it is collected in reservoirs or ponds and becomes an expense for the manner of its disposal rather than an asset. This lime has some value as a fertilizer as it contains a small amount of potash, nitrogen, and phosphoric acid.

I have found that the beet sugar residue and waste lime or lime cake may be combined in such way as to form a powder which can be utilized in the usual way, which will not absorb moisture from the atmosphere and become wet and sticky and difficult of application, and which will serve as an ideal fertilizer for beets and other vegetable products which are low in phosphoric acid as compared with potash, which is the condition which exists in the fertilizer produced from the beet sugar residue and the waste lime.

In the preferred practice of the invention, the beet sugar residue is evaporated to a density ranging from 30 to 42° Baumé and the waste lime is dried until it is nearly free from water. The beet sugar residue as thus reduced is mixed with one part of sulphuric acid to 10 parts of residue and the mass heated until chemical action in the mass is completed. The hot mass is then poured over 10 parts of the dry waste lime and the whole is mixed thoroughly. The mixture is then run through a drier heated to a temperature of 200° C., after which it is reduced to a coarse powder form in a grinding machine.

The fertilizer thus obtained does not absorb moisture from the atmosphere, or at least the absorption is relatively so low that the powder does not become sticky and remains permanently in powder form. An analysis of the fertilizer as thus produced indicates that it has approximately the following plant foods:

| | Per cent. |
|---|---|
| Potash ($K_2O$) | 4.00 |
| Nitrogen (N) | 2.00 |
| Phosphoric acid ($P_2O_5$) | .50 |
| Calcium carbonate ($CaCO_3$) | 34.00 |

While the proportions of acid and beet sugar residue as above set forth give the best results, it is possible to carry out the process with a smaller proportion of acid. As low an amount of acid as one half part to ten of residue may be employed and still secure fairly good results. A higher proportion of acid than one part to ten of residue may also be employed, but the results are no better and the process is more expensive.

Other lime compositions, aside from the waste lime may also be employed, such as ordinary pulverized limestone or gypsum, but they are more expensive, and not so desirable, as the waste lime is already in powder form and contains small quantities of materials valuable as fertilizers such as the phosphoric acid, potash and nitrogen which the limestone or gypsum do not contain.

In addition to the above method of producing the fertilizer in its best form, it may be produced by the admixture of other proportions of lime and residue and without the use of the acid, but such other forms of fertilizer are inferior in grade and in that the powder produced absorbs moisture from the atmosphere and becomes sticky and difficult to handle unless the proportion of lime to residue is very high. One method of procedure without the use of the acid involves the evaporation of the residue, the same as above set forth, after which, waste lime, which has been dried is mixed with the residue in the proportion of approximately one part of the residue to three parts of the waste lime by weight, or in the proportion of one part of the residue to two parts of waste lime. The mixture thus produced is dried and pulverized and gives a powder which is useful for fertilizing. This mixture does not absorb moisture to such an extent as to make it difficult to handle, but is of relatively low grade as a fertilizer.

Other mixtures may also be made without the use of the acid and employing in one case two parts of lime to one part of residue and in another case three parts of lime to two parts of residue, but these mixtures absorb moisture and become sticky when exposed to a damp atmosphere.

What I claim is:

1. The process of making a fertilizer in solid form which consists in treating concentrated beet sugar residue with sulphuric acid, heating the mass and then treating with lime.

2. The process of making a fertilizer in solid form which consists in treating concentrated beet sugar residue with sulphuric acid, heating the mass, adding thereto a substantially equal quantity by weight of lime, drying the product and reducing it to powder form.

3. The process of making a fertilizer in solid form which consists in treating concentrated beet sugar residue with sulphuric acid, in the ratio of ten of the residue to at least one half part of acid, heating the mass, adding to the mass ten parts of waste lime, drying the product thus formed and reducing it to powder form.

4. A fertilizer in the form of a solid formed by treating concentrated beet sugar residue with sulphuric acid, and then mixing the compound thus produced with lime and drying.

In testimony whereof, I have hereunto subscribed my name this third day of June, 1922.

YASUJURO NIKAIDO

Witnesses:
OLIVE M. SCHMOCK,
H. F. CHAPIN.